United States Patent
Garman

[15] 3,693,463
[45] Sept. 26, 1972

[54] LINKAGE FOR A RECIPROCATING ENGINE CRANKSHAFT

[72] Inventor: Wilbur G. Garman, 349 E. 16th St., San Bernardino, Calif. 92404

[22] Filed: Aug. 3, 1970

[21] Appl. No.: 60,356

Related U.S. Application Data

[63] Continuation-in-part of Ser. No. 758,532, Sept. 9, 1968, Pat. No. 3,568,416.

[52] U.S. Cl. ..................74/38, 123/197 AB, 74/520
[51] Int. Cl. ..............................................F16h 21/26
[58] Field of Search......................74/38, 39, 40, 520; 123/197 AC, 197 AB, 197 R

[56] References Cited

UNITED STATES PATENTS

| | | |
|---|---|---|
| 2,295 | 10/1841 | Johnson..........................74/38 |
| 1,784,431 | 12/1930 | Green............................74/38 |

FOREIGN PATENTS OR APPLICATIONS

| | | | |
|---|---|---|---|
| 2,704 | 2/1899 | Great Britain..................74/38 |

Primary Examiner—William F. O'Dea
Assistant Examiner—Wesley S. Ratliff, Jr.
Attorney—Christie, Parker & Hale

[57] ABSTRACT

A connecting linkage between a piston and a crank pin of a crankshaft in a reciprocating engine comprises a crank pin extension link pivotally connected at one end to the piston rod and pivotally connected at the other end to the crank pin. A toggle arm, which is longer than the crank pin extension link, pivots at one end about a stationary pivot point, and is pivotally connected at the other end to the point of connection between the piston rod and crank pin extension link. The toggle linkage drives the crank pin through an arc of substantially more than 180° during the power stroke of the piston, and applies a tangential thrust to the crank pin during a substantial portion of the power stroke of the piston.

6 Claims, 11 Drawing Figures

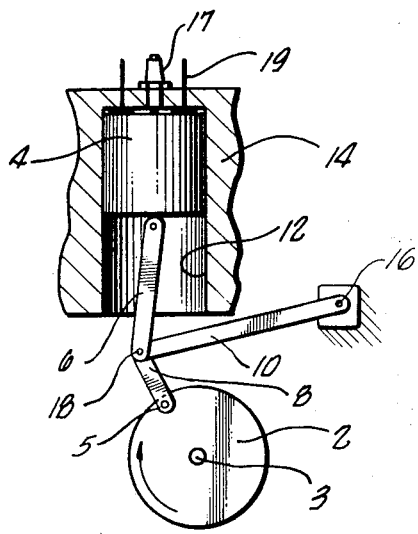
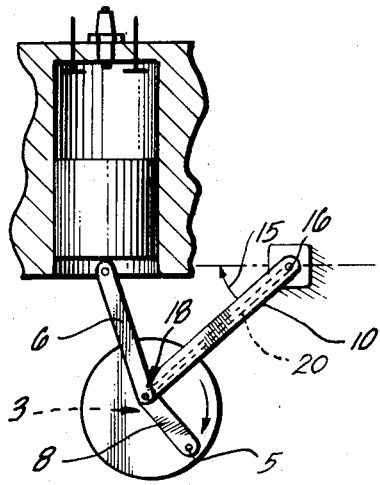
FIG_1.  FIG_2.
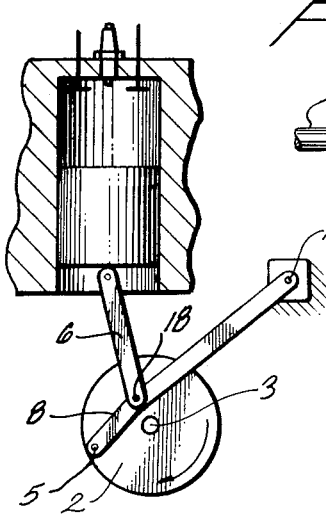
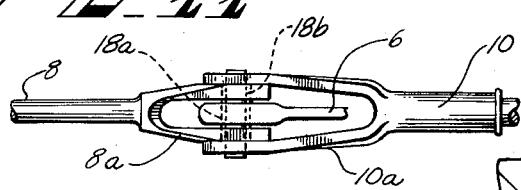
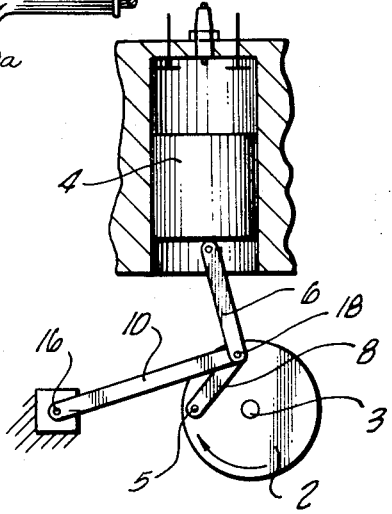
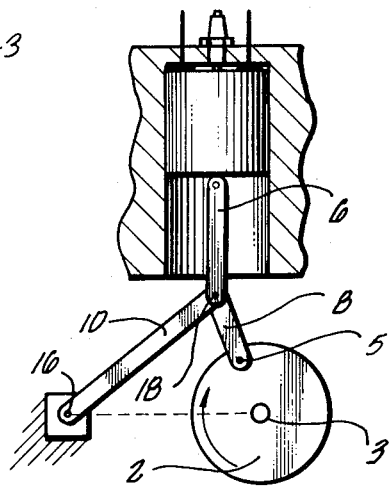
FIG_3.  FIG_11.  FIG_5.  FIG_4.
INVENTOR.
WILBUR G. GARMAN
BY Christie, Parker & Hale
ATTORNEYS

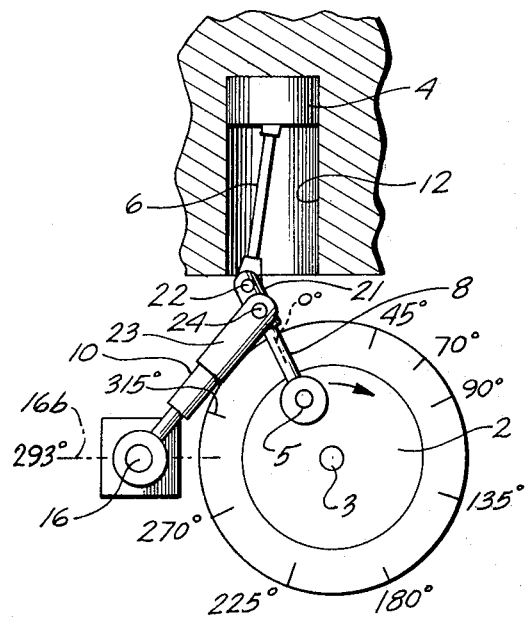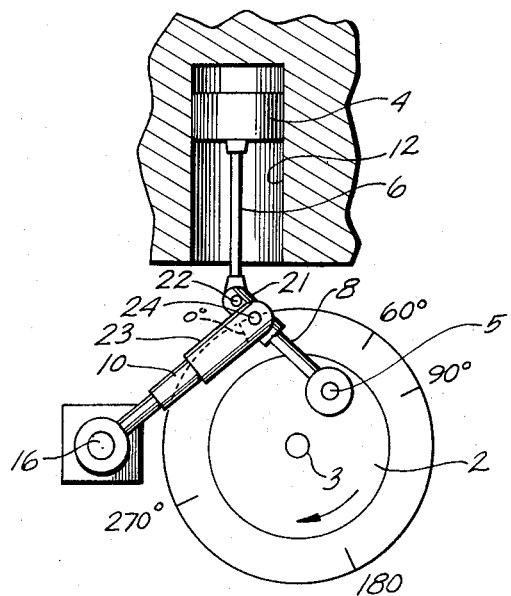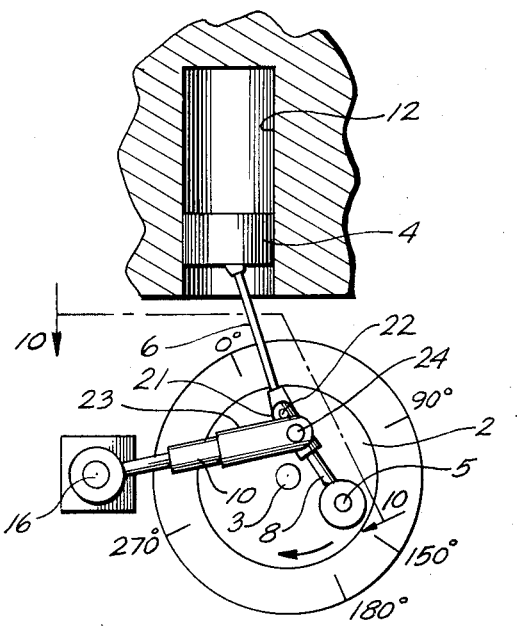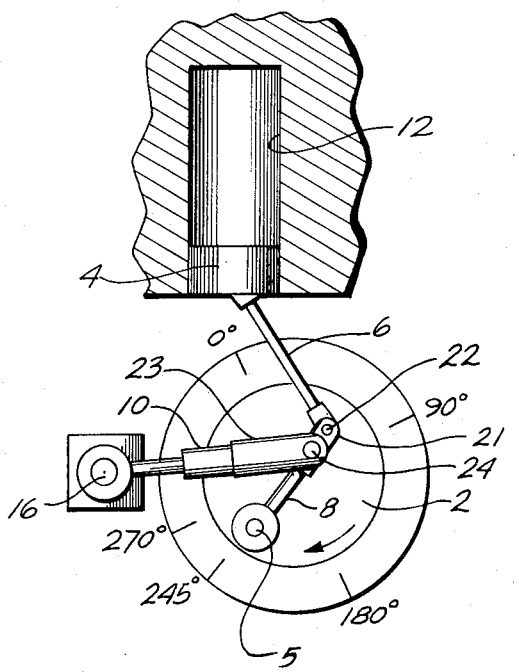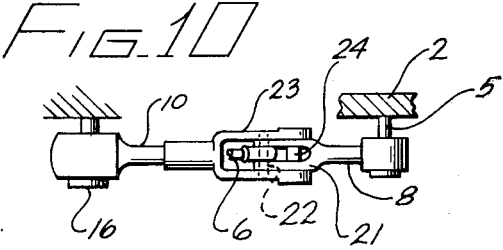

LINKAGE FOR A RECIPROCATING ENGINE CRANKSHAFT

CROSS-REFERENCE TO RELATED APPLICATION

This application is a continuation-in-part of my application, Ser. No. 758,532, filed Sept. 9, 1968, now Pat. No. 3,568,416.

BACKGROUND OF THE INVENTION

This invention relates to a linkage for connecting a piston to the crank pin of a crankshaft, and more particularly to a toggle arm in combination with a piston rod and a crank pin extension link for improving the effective application of thrust transmitted to the crankshaft during the power stroke of the piston.

Conventional internal combustion engines, such as diesel and automobile engines, have long used a piston rod and crank pin as the linkage between the piston and crankshaft. Although of proven value, this linkage does not efficiently convert translational motion of the piston into rotational motion of the crankshaft. Piston thrust in conventional engines is effectively transmitted to the crankshaft during the intermediate portion of the power stroke, but there is substantial lost motion in the piston travel during the beginning and end portions of the power stroke. The greatest thrust is available in the cylinders of conventional engines at the beginning of the power stroke, but the conventional linkage does not effectively transmit this thrust to the crankshaft.

SUMMARY OF THE INVENTION

Briefly, this invention includes a linkage for connecting a piston with the crank pin of a crankshaft in a reciprocating engine. The linkage includes a piston rod pivotally secured to the piston, a crank pin extension link which is pivotally secured at one end to the piston rod and at the other end to the crank pin. The extension link has a length greater than the radius of the crank pin throw and less than the diameter of the crank pin throw. A toggle arm, which is longer than the crank pin extension link, is pivotally secured at one end to the pivotal connection between the piston rod and crank pin extension link. The other end of the toggle arm is secured to a stationary pivot point which is located so that the toggle arm transmits force between the piston and the crank pin through the piston rod and crank pin extension link in a substantially tangential direction to the crankshaft during a substantial portion of the power stroke of the piston. The linkage also drives the crank pin and the crankshaft through more than one-half a revolution during the power stroke of the piston.

In one form of the invention, the toggle arm, crank pin extension link, and piston rod are mutually connected by a single wrist pin. The location of the mutual pivot point is determined by positioning of the fixed end of the toggle arm at a point so that the crank pin extension link travels in a substantially tangential relation to the crankshaft during the beginning and end portions of the power stroke of the piston. Thus, the force exerted by the piston during its motion in the cylinder is effectively transmitted to the crankshaft during the portions of the power stroke in which piston thrust is least effectively transmitted to the crankshaft in conventional engines.

The stationary pivot point of the toggle arm may be located on either side of the crankshaft to apply tangential force to the the crank pin and drive the crank pin through more than 180° of rotation during the power stroke of the piston. However, the toggle action of the crank pin extension link is more pronounced during particular portions of the piston travel, depending upon which side of the crank shaft the toggle arm pivot point is located. One side may be more advantageous than the other, depending upon the type of fuel used, for example.

The piston rod is preferably longer than the crank pin extension link. The length of the piston rod, however, is not critical, and can be varied to reduce side thrust on the piston to thereby reduce frictional power loss. For example, a long piston rod can be used to reduce side thrust on the piston without lengthening the stroke. The toggle arm is pivotally connected to the crank pin extension link and piston rod and extends to a point adjacent and crankshaft, where it is pivotally secured to the engine block. The toggle arm is of such length that the crank pin extension link is maintained in a tangential relation to the crankshaft during a substantial portion of the power stroke of the piston, a preferred length being more than the diameter of the crank throw. Preferably, the length of the toggle arm is about 1-½ times the diameter of the crank throw, and the extension link preferably has a length of about five-eighths the diameter of the crank throw.

During the portion of the piston travel when the piston is near bottom dead center, latent inertial energy is converted by the toggle linkage to tangential thrust which carries the crank pin through substantially more than 180° of rotation during the power stroke of the piston so as to permit scavenging, breathing, or similar operations to be performed within the cylinder. Upon further rotation of the crankshaft, the crank pin extension link exerts a force on the mutual pivot point of the piston rod, toggle arm, and crank pin extension link that rapidly returns the piston to its top dead center position. The rapid return of the piston is of particular value in diesel engines and the like, where rapid compression is essential to operation of the engine.

The toggle arm, crank pin extension link, and piston rod, can be connected to each other at more than a single pivot point. For example, a double wrist pin arrangement can be used to connect the piston rod and crank pin extension link, and to separately connect the toggle arm to the crank pin extension link at a point adjacent to its connection to the piston rod. This configuration produces a walking beam action on the crank pin which applies tangential force to the crank pin prior to when the piston reaches top dead center during its travel. The walking beam action blends into a toggle action which applies a tangential force to the crank pin through a substantial portion of the piston's power stroke. The toggle action blends into a walking beam action prior to bottom dead center position of the piston to apply a tangential force to the crank pin through end portion of the power stroke of the piston. Thus, the linkage transmits thrust to the crank pin through top dead center and bottom dead center positions of the piston, which are the portions of the piston travel during which piston thrust is least effectively transmitted to the crankshaft in conventional engines.

The linkage of this invention can be employed in any reciprocating engine, including any number of pistons. It is adaptable for use with punch presses, cutting machinery, conveying machinery, and the like, as well as with internal combustion engines. The linkage can also be employed in engines wherein force is exerted on a piston by the action of expanding vapors, gases, steam, or hydraulic fluid. Because of the high efficiency obtained by the linkage, it is particularly valuable for use with two or four-cycle internal combustion engines.

The linkage of this invention is particularly useful in diesel engines, where air or other gases are compressed to a temperature which is sufficiently high to ignite fuel injected into the cylinders. Similarly, in refrigeration machinery, rapid heat transfer can be obtained by using the linkage, where the temperature is raised by the heat of compression of the apparatus. In these types of machinery, the compression stroke is of crucial importance, since rapid compression of the gases is essential to satisfactory operation of the engines. The linkeage described herein is useful in these types of machinery because of the high speed compression stroke it produces.

BRIEF DESCRIPTION OF THE DRAWINGS

These and other aspects of the invention will be more fully understood by referring to the following detailed description and the accompanying drawings, in which:

FIG. 1 is an elevation showing the toggle linkage at the beginning of the power stroke of the piston;

FIG. 2 is an elevation showing the linkage of FIG. 1 when the piston nears the end of the power stroke;

FIG. 3 is an elevation showing the linkage of FIG. 1 during the return stroke of the piston;

FIG. 4 is an elevation showing an alternative configuration of the toggle linkage of FIG. 1 at the beginning of the power stroke of the piston;

FIG. 5 is an elevation showing the toggle linkage of FIG. 4 during the return stroke;

FIG. 6 is an elevation showing an alternative toggle linkage in which a double wrist pin arrangement connects the piston rod, toggle arm, and crank pin extension link, and in which the linkage is shown at the beginning of the power stroke of the piston;

FIG. 7 is an elevation showing the linkage of FIG. 6 with the piston just past top dead center during the power stroke;

FIG. 8 is an elevation showing the linkage of FIG. 6 when the piston is approaching bottom dead center during the power stroke;

FIG. 9 is an elevation showing the linkage of FIG. 6 when the piston is at bottom dead center;

FIG. 10 is a plan elevation taken on line 10—10 of FIG. 8; and

FIG. 11 is a plan elevation showing a concentric wrist pin arrangement for use with the toggle linkages shown in FIGS. 1-5.

DESCRIPTION OF THE PREFERRED EMBODIMENTS

Referring to FIG. 1, a crankshaft 3 of an internal combustion engine has a crank throw 2 and a crank pin 5. The crank pin is connected to a piston 4 by a piston rod 6 and a crank pin extension link 8. One end of the crank pin extension link is pivotally secured to the crank pin, and one end of the piston rod pivots relative to the piston in the usual manner. The opposite ends of the crank pin extension link and piston rod are pivotally connected together at a pivot point 18. A toggle arm 10 is pivotally connected to the ends of the crank pin extension link and the piston rod at pivot point 18.

As shown in FIG. 11, a concentric wrist pin arrangement pivotally connects the piston rod, toggle arm, and crank pin extension link at pivot point 18. The end of crank pin extension link 8 forms a yoke 8a which is pivotally connected to the end of piston rod 6 by an outer wrist pin 18a. The outer end of toggle arm 10 forms a yoke 10a which fits around the outside of yoke 8a and is connected to piston rod 6 and crank pin extension link 8 by an inner wrist pin 18b which is fitted in the opening through outer wrist pin 18a.

The piston is disposed above the crankshaft 3 in a cylinder 12 of housing 14. A spark plug 17 and valves 19 are disposed at the top of the cylinder 12, and these components function as in conventional internal combustion engines. However, the cam lobes (not shown) have a different arrangement than in conventional engines, because the crank pin 3 is driven through a substantially greater arc during the power stroke of the piston than the crank pin of conventional engines, as will be described in detail below. The toggle arm 10 has its stationary end pivotally secured to the housing 14 at a fixed point 16 adjacent to the cylinder. The point 16 is shown at the right side of the crankshaft 3 in FIGS. 1-3. However, the point 16 can be located on the left side of the crankshaft, as shown in FIGS. 4 and 5.

Preferably, points 18, 5, and 3 are collinear at the start of the power stroke. The toggle arm 10 is longer than the crank pin extension link 8, and the crank pin extension link is longer than the radius of the crank throw 2 and shorter than the diameter of the crank throw.

In use, during reciprocating movement of the piston, piston thrust causes the toggle linkage to produce a toggle action so that piston thrust is directed substantially tangentially to the crankshaft by the crank pin extension link, to drive the crankshaft in a clockwise direction, as indicated by the arrow in FIGS. 1-3. The toggle arm 10 maintains the tangential position of the crank pin extension link 8 throughout a substantial portion of the power stroke of the piston. In conventional engines, the linkage does not effectively transmit piston thrust to the crank pin during the beginning and end portions of the power stroke of the piston. The toggle linkage shown in FIGS. 1-3 improves the efficiency of power transmission from the piston to the crank pin, when compared with conventional reciprocating engine operation, because it applies tangential thrust to the crank pin during the beginning and end portions of the power stroke of the piston.

As the piston nears the end of the power stroke, as shown in FIG. 2, the crank pin extension link 8 pivots in a clockwise direction away from toggle arm 10 to produce a pronounced "forward toggle action" on the crank pin which exerts a strong tangential force on the crank pin during the end portion of the power stroke. Thus, good power transmission is obtained, because the forward toggle action improves the torque developed by the crankshaft during the low pressure portion of the power stroke, when compared with conventional engines.

As the piston travels through its bottom dead center position, the tangential force applied to the crank pin by the toggle linkage shown in FIGS. 1–3 causes the crank pin extension link to continue rotating in a clockwise direction away from the toggle arm 10, with the result that the crank pin travels substantially more than 180° during the power stroke of the piston. During this portion of the cycle, relatively small displacement of the piston drives the crankshaft through a correspondingly large arc, because inertial energy of the linkage is converted to kinetic energy of the crank pin through the linkage's tangential application of thrust.

The toggle arm travels through an angle 15 of about 45° during reciprocating movement of the piston. The moving end of the toggle arm 10 moves close to the center of the crankshaft. The toggle arm does not travel over the center of the crankshaft, because this would lock the mechanism. FIG. 2 also shows a lubrication channel 20 within the toggle arm 10 for use in lubricating pivot point 18.

Although the stationary pivot point 16 of the toggle arm 10 is positioned to the right of the crankshaft in FIGS. 1–3, it can be positioned to the left of the crankshaft. FIGS. 4 and 5 show the stationary pivot point 16 located to the left of the crankshaft on an imaginary line 16a extending through the center of the crankshaft. With this arrangement, the crank pin extension link 8 is similarly maintained in a substantially tangential relation to the crankshaft 3 during the power stroke. As above, force transmitted through the piston rod 6 to the crankshaft 2 is directed substantially tangentially to the crankshaft by the extension link 8 to drive the crankshaft in a clockwise direction, as indicated by the arrow in FIG. 4. The toggle arm 10 maintains the tangential position of the crank pin extension link 8 throughout the power stroke of the piston.

FIG. 5 shows the position of the linkage during the return stroke of the piston. The crank pin extension link 8 has pivoted toward the toggle arm 10 to produce an "inverted toggle action" on the crank pin, with the crank pin extension link exerting a force on the mutual pivot point 18 that causes the piston to be returned to its closed position in an extremely fast action. The effective leverage ratio obtained is about 1-½ to 1. Continued rotation of the crankshaft 2 then moves the linkage members into the position as shown in FIG. 4, for repetition of the cycle.

FIGS. 6 through 10 show an alternative toggle linkage which includes a double wrist pin arrangement for connecting the ends of piston rod 6, crank pin extension link 8, and toggle arm 10. One end of the crank pin extension link 8 forms a yoke 21 which is pivotally secured to the piston rod 6 by a first wrist pin 22. The outer end of the toggle arm 10 forms a yoke 23 which fits around the outside of yoke 21. The toggle arm yoke 23 is pivotally secured to the yoke 21 by a second wrist pin 24 at a point spaced from wrist pin 22 and laterally offset from the axis of the piston rod. The double wrist pin arrangements shown by way of example only, and other means for connecting the ends of the piston rod, crank pin extension link, and toggle arm in an eccentric arrangement can be used without departing from the scope of the invention. For example, the inside-outside wrist pin arrangement shown in FIG. 3A can be made in an eccentric configuration to obtain a double wrist pin action. Such a mechanism (not shown) includes a first yoke at the end of crank pin extension link 8 which is pivotally secured to the end of piston rod 6 by an outside sleeve. The outer end of the toggle arm 10 forms a second yoke which fits around the outside of the first yoke. The second yoke is pivotally secured to the first yoke. The second yoke is pivotally secured to the first yoke by an inside sleeve which extends through the outside sleeve along an axis which is offset from the axis of the outside sleeve in the direction toward the crank pin. The outside sleeve is keyed to the crank pin extension link. This maintains the pivot point of the piston rod away from the crank pin to produce increased leverage over the concentric double wrist pin arrangement.

Toggle arm 10 pivots about pivot point 16 which lies on a substantially horizontal imaginary line 16b (FIG. 6) extending through the center of the crankshaft. In an alternative embodiment of the double wrist pin linkage (not shown), toggle arm 10 can be mounted on the other side of the crankshaft above the crank throw. The point 16 also can be located above or below the line 16b without significantly affecting the operation of the linkage. The point 16 should not be located where movement of the piston would cause the toggle arm to travel over the center of the crankshaft and lock the mechanism.

The crank pin extension link 8 shown in FIGS. 6–10 is longer than the radius of the crank throw and shorter than the diameter of the crank throw, and the toggle arm shown in FIGS. 6–10 is longer than the length of the crank pin extension link, and preferably longer than the diameter of the crank throw.

In use, during reciprocating movement of the piston, the toggle linkage shown in FIGS. 6–10 produces a walking beam action on the crank pin through the end portion of the return stroke and the beginning portion of the power stroke of the piston to produce a tangential thrust on the crank pin as the piston passes through its top dead center position shown in FIG. 6. The walking beam action blends into a toggle action on the crank pin which produces a tangential thrust on the crank pin as the piston travels through the beginning portion of the power stroke shown in FIG. 7. During the intermediate portion of the power stroke, from FIG. 7 to FIG. 8, the toggle arm and crank pin extension link apply thrust to the crank pin in the convention manner. During the end portion of the power stroke of the piston, from FIG. 8 to FIG. 9, continued downward movement of the piston causes the crank pin extension link to swing back so as to rotate in a clockwise direction about wrist pin 22 and toward toggle arm 10. This action causes the conventional thrust to blend into a toggle action on the crank pin which applies a tangential force to the crank pin as shown in FIG. 8. During the end portion of the power stroke of the piston and the beginning portion of the return stroke, the toggle action blends into a walking beam action which produces a tangential thrust on the crank pin as the piston passes through its bottom dead center position shown in FIG. 9. The crank pin is driven through an arc of approximately 245° during the power stroke of the piston, as shown in FIG. 9.

Thus, the linkage shown in FIGS. 6 through 10 blends together in sequence walking beam action, toggle action, conventional action for a short distance, toggle action, and walking beam action to produce tangential thrust on the crankshaft so that the thrust developed by the piston is effectively applied to the crankshaft throughout its entire power stroke.

During the return stroke of the piston from the position shown in FIG. 9 to the position shown in FIG. 7, inverted toggle action applied to the crank pin extension link exerts leverage on the piston rod to rapidly return the piston to top dead center.

The toggle linkage of this invention has the advantage over the conventional rod and crankshaft arrangement of distributing piston trust over a longer period of time during the power stroke, because the crank pin is driven through an arc of greater than 180° during the power stroke of the piston. Thus, a longer burn time results during the power stroke, and greater breathing results during the intake stroke. Longer burn time also has the advantage of obtaining a more complete combustion of fuel delivered to the engine cylinders, with the result that more engine power is developed from a given amount of fuel than in conventional engines. Furthermore, the longer burn time produces a lower temperature of combustion which reduces the formation of oxides of nitrogen, which in turn are a significant factor in causing air pollution.

Moreover, the toggle linkage provides more usable thrust during the power stroke of the piston than convention reciprocating engines, which have substantial lost motion near top dead center and bottom dead center during the power stroke. The linkage of convention engines is effectively locked in top dead center and bottom dead center, with the result that a substantial portion of the piston thrust developed is dissipated in overcoming inertial and frictional forces in the conventional linkage. Piston thrust in conventional engines is effectively taken advantage of only during the intermediate portion of the power stroke. Conventional engines are generally operated at relatively high speeds to overcome the lost motion occurring at the beginning and end portions of the power stroke of the piston. The lost motion in the linkage of conventional engines at top dead center also is a contributing factor to undesirable detonation of fuel in the cylinders. The toggle linkage of this invention increases the effectiveness of the piston thrust applied to the crank pin during the beginning and near the end of the piston power stroke, when compared with conventional engines. This increased transfer of thrust to the crankshaft develops more engine power, produces a smoother operating engine, and substantially avoids detonation of fuel in the cylinders.

I claim:

1. A reciprocating engine comprising a rotary crankshaft having a crank pin; a piston disposed in an engine cylinder and movable therein to transmit power to the crankshaft; and a connecting linkage for transmitting power from the piston to the crankshaft, the connecting linkage including:
   a. a piston rod having one end pivotally secured to the piston;
   b. an elongated crank pin extension link having one end pivotally secured to the other end of the piston rod, the other end of the crank pin extension link being pivotally secured to the crank pin at a point spaced from the axis of rotation of the crankshaft,
   c. a toggle arm;
   d. means for pivotally connecting one end of the toggle arm with the crank pin extension link at a point spaced from the crank pin by a distance greater than the radius of the crank throw and less than the diameter of the crank throw; and
   e. means for pivotally securing the other end of the toggle arm to a stationary pivot point spaced from the pivot at the other end of the toggle arm by a distance greater than the diameter of the crank throw so that the toggle arm transmits force between the piston and the crank pin through the piston rod and crank pin extension link in a substantially tangential direction to the crankshaft during the power stroke of the piston to drive the crankshaft through more than one-half a revolution.

2. Apparatus according to claim 1 wherein the means for pivotally connecting the end of the toggle arm to the crank pin extension link comprises a single wrist pin for connecting the ends of the toggle arm, crank pin extension link, and piston rod at a mutual pivot point.

3. Apparatus according to claim 1 wherein the ends of the crank pin extension link are substantially collinear with the center of the crankshaft at the beginning of the power stroke.

4. Apparatus according to claim 1 wherein the effective length of the crank pin extension link is about five-eighths the diameter of the crank throw, and the effective length of the toggle arm is about 1-½ times the diameter of the crank throw.

5. Apparatus according to claim 1 wherein the effective length of the toggle arm is about 1-½ times the diameter of the crank throw; and wherein the stationary pivot point of the toggle arm is located below the piston on a substantially horizontal line through the center of the crankshaft.

6. A linkage for connecting the piston and the crank pin of a crankshaft in a reciprocating engine, the linkage comprising:
   a. a piston rod having one end pivotally secured to the piston;
   b. an elongated crank pin extension link having one end pivotally secured to the other end of the piston rod by a first wrist pin, the other end of the crank pin extension link being pivotally secured to the crank pin at a point spaced from the axis of rotation of a crankshaft;
   c. a toggle arm;
   d. means for pivotally connecting one end of the toggle arm with the crank pin extension link at a point spaced from the crank pin by a distance greater than the radius of the crank throw and less than the diameter of the crank throw, the connecting means comprising a second wrist pin connect to the crank pin extension link between the first wrist pin and the crank pin; and
   e. means for pivotally securing the other end of the toggle arm to a stationary pivot point spaced from the pivot at the other end of the toggle arm by a distance greater than the diameter of the crank throw so that the toggle arm transmits force between the piston and the crank pin through the piston rod and crank pin extension link in a substantially tangential direction to the crankshaft during the power stroke of the piston to drive the crankshaft through more than one-half a revolution.

* * * * *